Nov. 2, 1965    F. KESSELRING ETAL    3,215,866
SYNCHRONOUS CIRCUIT-INTERRUPTING DEVICES
Filed March 22, 1961    4 Sheets-Sheet 1

WITNESSES
Robert C. Baird
Bernard R. Gieguey

INVENTORS
Fritz Kesselring &
Lutz Seguin.
BY
Willard R. Crout
ATTORNEY

Nov. 2, 1965   F. KESSELRING ETAL   3,215,866
SYNCHRONOUS CIRCUIT-INTERRUPTING DEVICES
Filed March 22, 1961   4 Sheets-Sheet 2

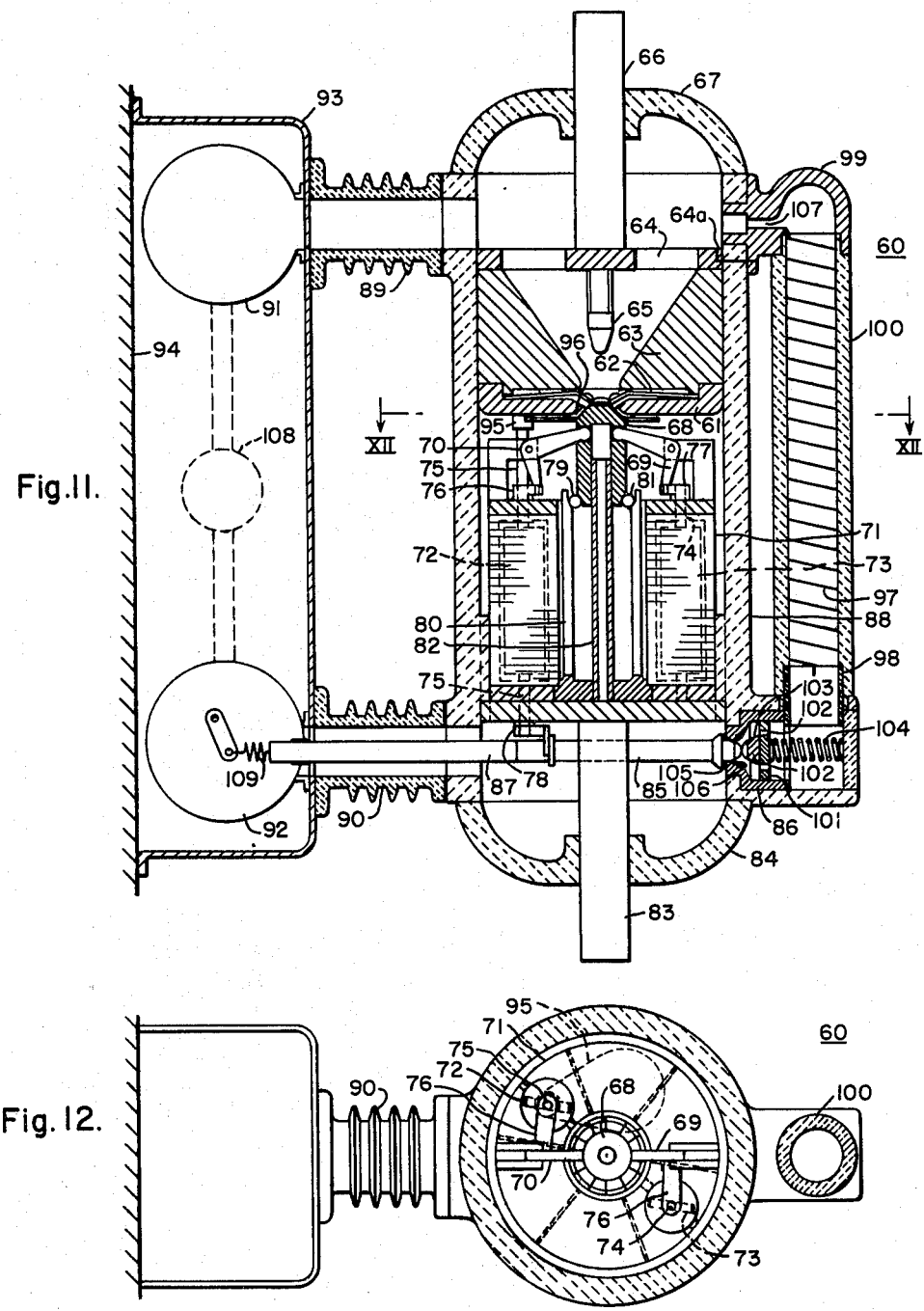

United States Patent Office 3,215,866
Patented Nov. 2, 1965

3,215,866
SYNCHRONOUS CIRCUIT-INTERRUPTING DEVICES
Fritz Kesselring, Kusnacht, Zurich, and Lutz Seguin, Bergdietikon Aargus, Switzerland, assignors to Siemens - Schuckertwerke Aktiengesellschaft, Erlangen, Germany, a corporation of Germany
Filed Mar. 22, 1961, Ser. No. 97,656
Claims priority, application Germany, Mar. 30, 1960, S 67,799; Aug. 18, 1960, S 69,989
20 Claims. (Cl. 307—133)

This invention relates to circuit-interrupting devices in general and, more particularly, to synchronous control operators therefor.

A general object of the present invention is to provide an improved circuit-interrupting device in which maximum efficiency is achieved by opening the contacts close to a current zero on the alternating current wave.

A more specific object of the present invention is to provide an improved synchronous operator which will indicate the point on the current wave at which the instantaneous current is dropping to a current zero, said synchronous operator having as its function the control of contact movement and/or blast-valve operation of a circuit interrupter.

Still another object of the present invention is the provision of an improved simplified synchronous operator which may be employed to achieve accurate control of the time of contact separation in a circuit-interrupting device.

Further objects and advantages will readily become apparent upon reading the following specification, taken in conjunction with the drawings, in which:

FIG. 11 illustrates a modified type of compressed-gas circuit interrupter in which the synchronous operator of the present invention is utilized to effect contact motion and blast-valve operation; and, FIG. 12 is a sectional view taken substantially along the line XII—XII of the compressed-gas circuit interrupter of FIG. 11.

For the control of synchronous switches, there has previously been proposed various types of synchronous tripping devices wherein the pre-tripping time $t_v$ is formed, for example, by the quotient $$i / \frac{di}{dt}$$

It has already been proposed to produce a current or flux which leads current zero by the time $t_v$, and which controls a magnetic system to cause a tripping impulse to be given at the time $t_v$. As long as the current to be interrupted is relatively symmetrical with respect to the time axis, such synchronous tripping devices operate satisfactorily. If, however, it is desired to interrupt currents which have shifted considerably during the first half wave of the short circuit, false tripping operations may be expected.

The primary object of the present invention is to overcome this disadvantage and to provide a synchronous tripping device or synchronous operator which is characterized by a moving-coil system, the magnetic circuit of which is energized in dependence upon the current to be interrupted, and the moving coil of which is traversed by a current depending upon the rate of change of the current to be interrupted.

Figure 1:
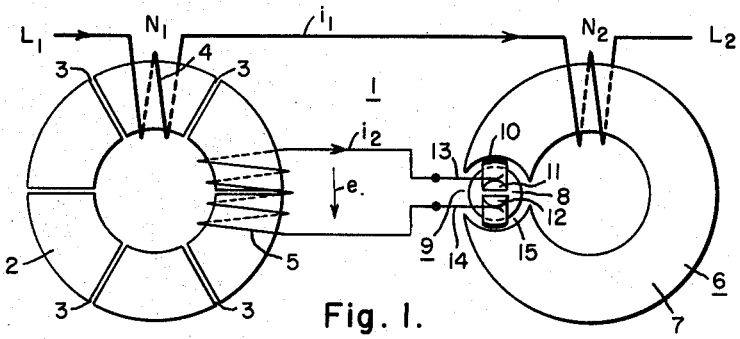
FIGURE 1 is a diagrammatic view of a synchronous operator utilizing the principles of the present invention.
Figure 2:
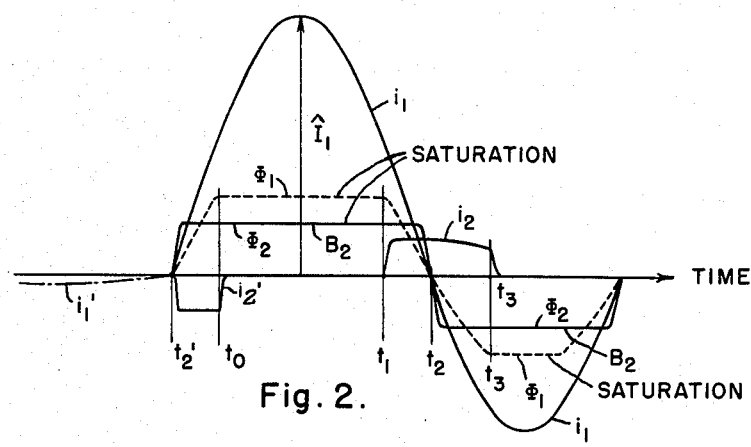
FIG. 2 is a graph of the time conditions of the current and magnetic flux in the synchronous operator of FIG. 1 for one full wave of the alternating current being interrupted.
Figure 3:
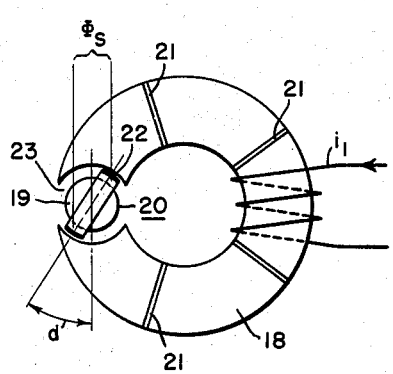
FIG. 3 is a modified type of synchronous operator utilizing principles of the present invention.
Figure 4:
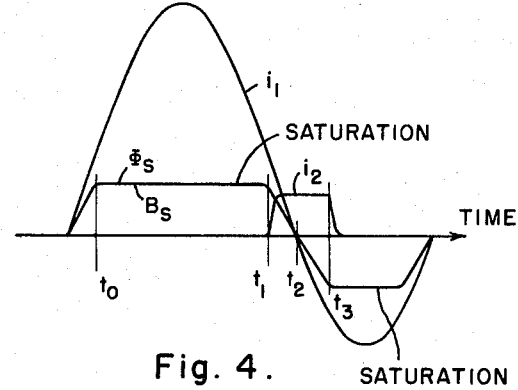
FIG. 4 is a time graph of the current and flux conditions for the synchronous operator of FIG. 3.

FIGS. 1 to 4 illustrate the principles underlying the operation of this synchronous tripping device, which also is particularly suitable for effecting an immediate reclosure after an unsuccessful synchronous switching operation. FIGS. 1 and 3 show two embodiments of the invention, and FIGS. 2 and 4 represent, respectively, the associated time graphs illustrating the time relationship of the current and magnetic fluxes.

Referring to FIG. 1, the reference numeral 1 generally designates a synchronous operator comprising an iron core or inductive device 2 having preferably six uniformly distributed air gaps 3. A primary series winding 4 is provided being connected in series with the circuit $L_1$, $L_2$ carrying the current $i_1$ to be interrupted. The primary series winding 4 is consequently supplied with the current $i_1$ to be interrupted, thus providing the magnetomotive force for energizing the iron core 2. The provision in the iron core 2 of a larger number of small equally-spaced air gaps 3 has the advantage of substantially reducing magnetic leakage, whereby the cross-section of the iron can be reduced without a change of the induction in the operating air gaps. The secondary winding of the synchronous operator 1 is designated by the reference numeral 5, and the reference numeral 6 generally designates an auxiliary magnetic core. The numerals 7 and 8 indicate the magnetic circuit of a moving-coil system, generally designated by the reference numeral 9. The ends of the moving coil 10 are connected to two segments 11, 12, which, in turn, are connected to the secondary coil 5 of the synchronous operator 1 through brushes 13 and 14. The current flowing through the moving coil 10 is designated $i_2$.

The ampere turns $i_1 N_1$ produce in the transformer 2 a flux $\Phi_1$. A change in the flux $\Phi_1$ produces an E.M.F. of the magnitude $e$ in the secondary winding 5. If, now, the circuit comprising the secondary winding 5 and the moving coil 10 is predominantly an ohmic one, the current $i_2$ is substantially in phase with the E.M.F. $e$. On the other hand, the ampere turns $i_1 N_2$ sets up a flux $\Phi_2$ in the magnetic circuit 7, 8, to which corresponds an induction $B_2$ in the air gap 15 of the moving-coil system 9. Since the magnetic circuit 7, 8 has only this single air gap 15, it will be saturated already by a relatively small current, for example, by a current corresponding to 0.3 to 3 times the rated current. The resulting relationship is illustrated in FIG. 2.

Current $i_1$ sets up the flux $\Phi_1$, and the iron core 2 will become saturated at the instant $t_0$. From $t_0$ to $t_1$, the change of flux is negligible so that no E.M.F. will be induced in the secondary coil 5. From $t_1$ to $t_3$, the change in flux $\Phi_1$ is substantially constant. This causes a current $i_2$ to flow in the secondary winding 5 and, therefore, also in the single-turn coil 10, said current having a substantially rectangular characteristic as shown in FIG. 2. At $t_3$, the iron core 2 will again become saturated, whereupon the current $i_2$ will drop to zero corresponding to the time constant of the secondary circuit. The force F which acts upon the moving coil 10, during the time interval $t_1$ to $t_2$ may be expressed by the following formula:

$$F = 10.2(l)B_2 i_2 (KP) \text{ Kilogram (weight)}$$

Figure 10:
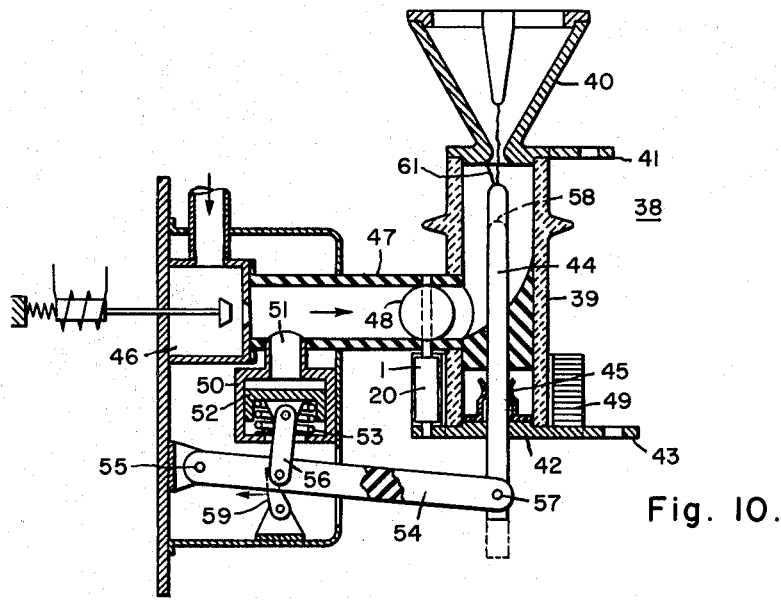
FIG. 10 illustrates a gas-blast-type of circuit-interrupting device utilizing the synchronous operator of FIG. 5 to control a damping valve, the contact structure being illustrated in the partially open-circuit position.

In this equation, $B_2$ is the magnetic induction in the air gap 15 of the moving-coil system 9 in webers per square meter; $i_2$ is the approximately constant maximum value of the current $i_2$; and "$l$" is the effective winding length of the moving coil 10 in meters, and 10.2 is a conversion factor for converting from the absolute system to the metric system. Within the interval $t_2$ to $t_3$ the current $i_2$ retains the same polarity, whereas the flux $\Phi_2$ and, therefore, also the air-gap induction $B_2$ change their signs. This causes the force acting upon the moving coil 10 to be effective in the opposite direction. From this, the following conclusion can be drawn: If an arc extinction takes place at the zero passage of the current at $t_2$, the negative half-wave of the current $i_1$ is missing. The interrupting operation will then be completed at $t_2$. If, however, the arc is not extinguished, the moving coil 10 (FIG. 1), which had engaged a stop (not shown), will move away from $t_2$ in the opposite direction and can, therefore, give a counter-command, which, for example, may effect an immediate bridging, or a reclosure of the associated synchronous switch, such as illustrated in FIGS. 10, 11 and 12 hereinafter more fully described.

However, it is also possible that the initially very small current $i_1'$, as indicated in FIG. 2 by a broken line, changes into the rapidly increasing current $i_1$. This causes the fluxes $\Phi_1$ and $\Phi_2$ to increase also, with the result that a negative current $i_2'$ will flow in the moving coil 10. Thus, the torque to which the moving coil 10 is subjected within the interval $t_2'$ to $t_0$ acts in a direction opposite to that during the interval $t_1$ to $t_2$. The movement of the coil 10 may be utilized, for example, to initiate immediately the reclosure of the associated synchronous switch (FIG. 11).

From FIG. 2 it is also clear that the synchronous tripping is not impaired despite the shift of the current $i_1$. By a proper selection of the air gaps 3 of transformer 2, the maximum pre-trip current $\hat{i}_v = \hat{i}_1 \cdot t_v$ can be adapted to any given requirements. In FIG. 2 it has been assumed that $i_1$ corresponds substantially to the maximum short-circuit current to be interrupted.

It has been found, mathematically and by tests, that with suitable dimensions of the two magnetic systems and of the moving coil 10, it is possible to obtain a movement of the moving coil 10 of, for example, 20° in about half a millisecond. As the current $i_1$ decreases, the current $i_2$ decreases similarly which results in a decrease of the force F. At the same time, the time interval $t_1$ to $t_2$ will increase so that the synchronous tripping impulse will be given in time, nevertheless. Generally, a smaller current will increase somewhat the pre-tripping time $t_v$. This, however, is immaterial since the smaller current also results in less arcing power.

FIG. 3 shows a modification of the invention wherein no additional transducer 2 is required. Reference numerals 18 and 19 designate the magnetic circuit of the moving-coil system 20 including the air gaps 21, which, preferably, are distributed symmetrically. In addition, there is provided the main air gap 23. The moving coil 22 comprises a winding closed upon itself, and may consist, for example, of a rectangular copper or aluminum frame. In the inoperative position, the plane of the coil 22 forms an angle $\alpha$ with the flux $\Phi_s$ linking the coil 22. The magnetic circuit 18, 19 is energized by the current $i_1$ to be interrupted. A variation of the flux $\Phi_s$ with respect to time causes an E.M.F. to be induced in the coil 22, which, in turn, causes a current $i_2$ to flow. Preferably, the coil 22 should be so designed that the ohmic component prevails over the inductive component so that the time constant of this coil 22 will be smaller than 1 ms., for example 0.2 ms., in the unsaturated condition of the magnetic circuit 18, 19.

The current and flux curves with respect to the arrangement of FIG. 3 are illustrated in FIG. 4. The current $i_1$ sets up a flux $\Phi_s$ to which corresponds an induction $B_s$ in the air gap 23. At $t_0$, the magnetic circuit 18 and 19 becomes saturated. From $t_1$ to $t_3$, the change, with respect to time, of the flux $\Phi_s$ remains substantially constant. This causes a current $i_2$ to flow in coil 22, which, with the linearly-decreasing induction $B_s$, again applies to coil 22 a torque, which may be used for supplying a synchronous impulse in the same manner as in the synchronous operator of FIG. 1. Examples of such applications are indicated in FIGS. 10–12 of the drawings.

It may be desirable to provide the air gaps 21 only in the upper half of the magnetic circuit 18, 19 of FIG. 3, whereas the lower half thereof may have only a few, or no additional air gaps 21 therein with the exception of the main air gap 23. In such case, the lower part of the moving coil 22 will be linked by a flux which corresponds approximately to $\Phi_2$ shown in FIG. 2, the flux in the upper portion of the coil, on the other hand, will be similar to $\Phi_1$ of FIG. 2.

Both in the embodiment according to FIG. 1 and in the embodiment according to FIG. 3, the movement of the moving coil produces also a counter-E.M.F., which is proportional to the peripheral speed of the moving coil. This counter-E.M.F. weakens the current $i_2$ slightly especially near the end of the movement of the coil. In certain circumstances it is, therefore, desirable to have the coil rotate at a lower speed and to provide a suitable transmission between the coil and the control element to be actuated.

The considerable advantage of the embodiment illustrated in FIG. 3 resides in the fact that no additional inductive device or transducer 2 is required, and that the moving coil 22, which represents a winding closed upon itself or, particularly, a simple frame, requires no supply conductors. On the other hand, however, the action of the force is somewhat lower since the induction $B_s$ decreases during the movement of the coil 22, whereas the induction $B_2$ according to FIG. 2 remains substantially constant. It has been found, however, that the system illustrated in FIG. 3 operates satisfactorily, too.

It is apparent that also with this arrangement, the direction of rotation will be reversed when the arc extinction does not take place at $t_2$ or the current characteristic changes suddenly. An essential advantage of the synchronous tripping device according to the present invention resides in the fact that the moment of inertia of the moving coil is extremely small, whereas the forces acting upon the moving coil reach values of up to 20 kiloponds and more, thereby allowing an acceleration of up to 5000 g.

In order to increase the torque with the embodiment according to FIG. 3 even further, there may be provided a first magnetic system corresponding to the system 7, 8 of FIG. 1 together with a frame corresponding to 22 in FIG. 3, with the position, however, of the moving coil 10 (FIG. 1). A second magnetic system with air gaps, which is energized by the current to be interrupted and which is disposed perpendicularly with respect to the plane of the frame, produces the current $i_2$ when the flux linking the frame changes, the air gap induction (produced by the first magnetic system) again remaining practically constant during the movement of the frame.

The shaft of the moving coil may have coupled thereto a contact system, for example, which may be adapted to effect the opening of the associated synchronous switch when rotated in one direction, whereas another contact may be closed upon rotation in the opposite direction, said latter contact effecting the immediate reclosure of the associated switch. Instead of contacts, there may also be used valves, rotary slide valves or the like, for effecting the closing and opening of the respective switch.

The synchronous tripping devices, as described above, generally include a moving coil system, the magnetic circuit of which is energized in dependence upon the current to be interrupted, and the moving coil of which is traversed by a current which is dependent upon the rate of change of the current to be interrupted. The synchronous operators, set forth above, comprise synchronous tripping devices having a moving coil, the moving coil in one embodiment being supplied from an additional air-gap type transducer, and the moving coil in the second embodiment (FIG. 3) constituting the secondary winding of an air-gap type transducer. The second system, according to FIG. 3, is characterized by its simple construction. It has been found mathematically and through tests that the angular velocity at which the moving coil of FIG. 3 moves is limited by the counter-E.M.F. induced as a result of said movement, and that said angular velocity increases to substantially above 100 $s^{-1}$ (radians per second) only near the zero passage of the main current so that, with a moving coil having a radius of, for example, 1 centimeter, a peripheral speed of about $$100 \text{ cm./s.} \cong 1 \text{ m./s.}$$

is obtained. This speed will be sufficient in many cases. In certain circumstances, however, it may be desirable to have higher angular velocities. One arrangement by means of which this can be accomplished is the embodiment with the separate air-gap transducer mentioned in the first place above (FIG. 1); the construction thereof, however, is somewhat complex and, therefore, more expensive.

It is an additional object of the present invention to overcome this drawback, and the invention is characterized in that the moving coil has associated therewith an additional winding linking the magnetic circuit of the moving coil.

Figure 5:
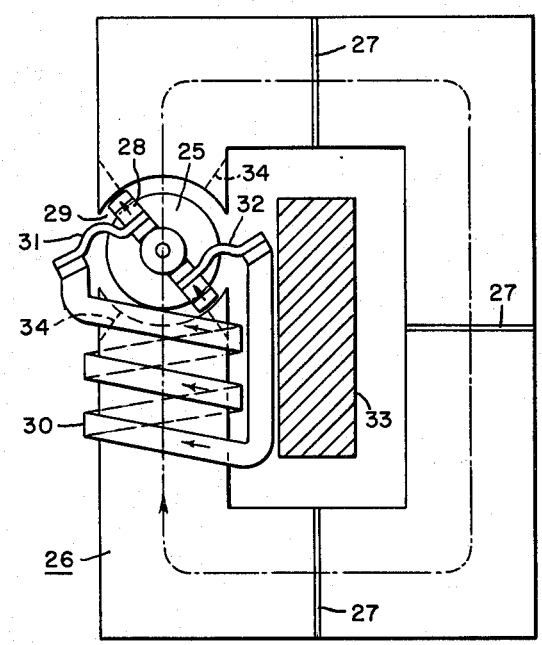
FIG. 5 is a modified type of synchronous operator embodying principles of the present invention.

With reference to FIG. 5 of the drawings, it will be observed that the reference numeral 26 generally designates a magnetic system having preferably a number of equally spaced air gaps 27. A rotatable magnetic core, or armature 25, carries a coil 28 which is adapted to rotate in the air gap 29 thus formed. The additional winding is designated by the reference numeral 30, and its ends are connected to the moving coil 28 through flexible conductors 31, 32. The reference numeral 33 designates the line conductor for the synchronously-controlled circuit breaker.

Normally the additional winding 30 will be wound in a sense corresponding to that of the moving coil 28, whereby the induced voltage will be increased corresponding to the number of turns of the additional winding 30 and the cross section of the iron core 26. With an additional winding 30 having two turns, the maximum angular velocity can be stepped up to from 3 to 4 times its original value. If the moving coil 28 is arranged symmetrically with respect to the central axis 24, such as illustrated in FIGS. 8 and 9, so that no E.M.F. can be induced therein by transformer action, the attainable angular velocity is somewhat lower, but it is possible to increase the air-gap induction and, thereby, the force acting upon the moving coil, particularly by making provision for the moving coil 28 to rotate in a saturated air-gap field as indicated by the tapered portions 34 in FIGS. 5, 8 and 9.

Figure 6:
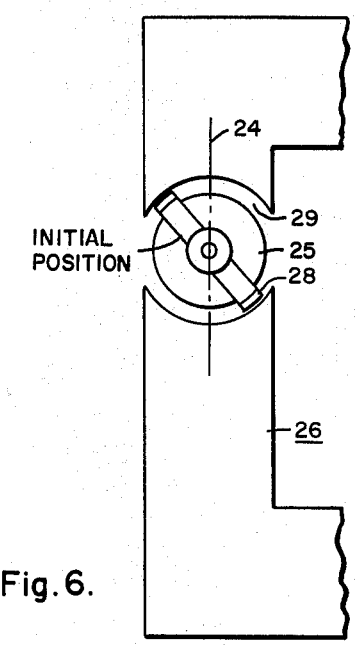
FIGS. 6–9 illustrate modified types of air gaps and range of rotative movement associated with the moving armature of the synchronous operator of FIG. 5.
Figure 7:
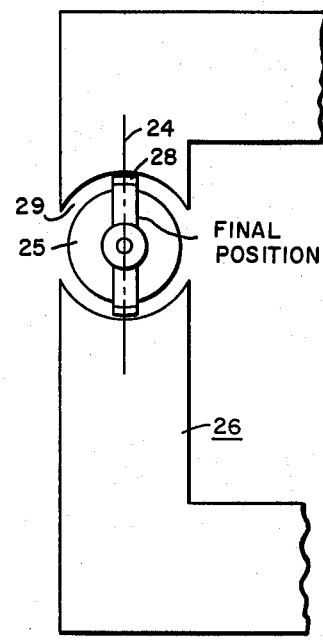

Thus, FIGS. 6–9 indicate two different possibilities for the movement of the moving coil 28. In FIGS. 6 and 7 the moving coil 28 is angularly displaced with respect to the central axis 24 of the magnetic circuit 26 in the beginning of its movement, and coincides with the central axis when in its final end position, as indicated in the drawings.

Figure 8:
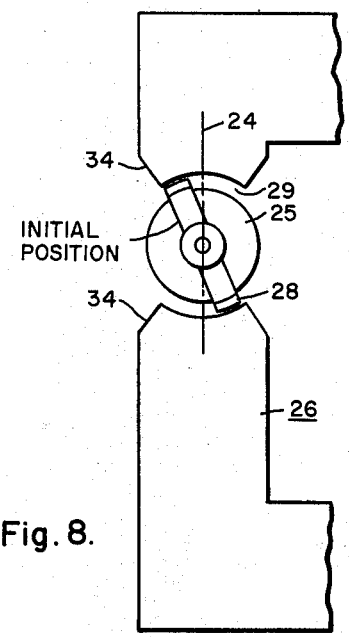
Figure 9:
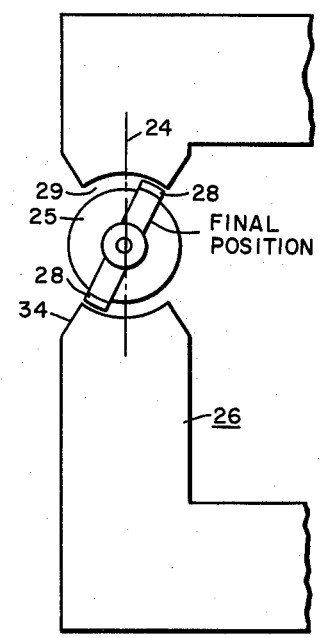

FIGURES 8 and 9, on the other hand, illustrate an arrangement of the moving coil 28 in which it is symmetrically located with respect to the central axis 24. Under these conditions and during the movement of the moving coil 28, the E.M.F. induced therein initially is cancelled out again by an opposite E.M.F. in the second half of the movement. Therefore, in this latter case, only that E.M.F. is effective with respect to the resultant rotary movement which is produced by transformer action in the stationary additional winding 30. A comparison of the four figures will show that in the case of FIGURES 8 and 9 the same angle of rotation can be obtained with tapered pole shoes as can be obtained in the case of FIGURES 6 and 7; consequently, in the case of FIGURES 8 and 9 the air-gap induction can be higher, as noted above.

FIG. 10 shows by way of example a form of construction of compressed-gas circuit interrupter utilizing the synchronous operator of the present invention. A compressed-gas-type of circuit interrupting structure 38 is illustrated. The reference numeral 39 designates the interrupting chamber in the form of an insulating cylinder. On the upper end, the insulating cylinder 39 carries a nozzle 40 having a terminal lead 41. The bottom of the insulating cylinder 39 is closed by a cap 42 having a terminal lead 43. The moving contact is designated by the reference numeral 44 and carries current from the terminal lead 43 by means of sliding fingers 45. The compressed gas is brought into the interrupting chamber 39 through a valve 46 and an insulating tube 47. The reference numeral 48 indicates a valve damper shown in the open position. It is coupled with a moving coil 20, such as illustrated in FIG. 3 of the drawings. The moving coil 20, as previously explained, rotates in the field of an electromagnetic system 49 excited from the interrupted current $i_1$. The reference numeral 50 designates a cylinder, which is connected through a tube 51 with the insulating tube 47. The reference numeral 52 denotes a piston, which is biased upwardly by a compression spring 53. The insulating rod 54 is pivotally connected, as at 55, on a fixed pivot and is coupled with the piston 52 by way of a link 56. In addition, the operating rod 54 is pivotally connected, by a pivot pin 57, with the movable rod-shaped contact 44. In the open-circuit position of the device illustrated by the dotted line 58, the insulating rod 54 is held by a latch 59 against the biasing action exerted by the compression spring 53.

The compressed-gas circuit interrupter 38 operating in conjunction with the synchronous operator 1 functions in the following manner: Initially the blast valve 46 is opened at an arbitrary instant $t_0$. As a result of this action, the piston 52 will be forced downwardly by the pressure exerted by the entering gas blast, and will move downwardly against the opposition afforded by the compression spring g3 until the movable contact pin 44 reaches the fully open position, indicated by the dotted line 58. Now if the current is increasing during this process, then the induced current will flow through the moving coil 20, which will, together with the magnetic system 49 produce in the air gap a torque, which causes the valve damper 48 to turn into a closed position. As a result, at first, the compressed air cannot enter the interrupting chamber 39 and the arc 61 burns with a much lower arc voltage than would be the case if it were subjected to the deionizing action of the entering gas blast. Now if the main current begins to decrease toward a current zero, then the current induced in the moving coil 20 will change its sign. The torque is reversed, and the valve damper 48 assumes the illustrated open position. By utilization of saturation of the magnetic system 49, it can be obtained that the current induced in the moving coil 20 begins to flow 0.5 to 2 milliseconds before the passage of the interrupting current through current zero. Now, the air can enter the interrupting chamber 39 from the insulating tube 47 and act intensively upon the arc 61 drawn within the nozzle 40. This will bring about rapid arc extinction.

If, on the contrary, a transformer operating at no-load should be disconnected, and, if, as a result of build-up of overvoltage causing a short circuit shortly before the no-load current of the transformer passes through zero, then current immediately sharply increases. This results in that the damper 10 will be moved instantly into the closed position by the moving coil 20, by which the action of the flowing gas upon the arc 61 is stopped. The arc has a very high current intensity, but a very low arcing voltage. As a result, when the current again begins to decrease, the valve damper 48 opens and the arc quenching action follows.

If the coil 20 and the damper 48 are mounted on the same shaft, then it can be obtained in a simple manner that the damper 48 opens wider the more quickly the current decreases towards zero. Thereby, it is possible to match the intensity of quenching to the intensity of the interrupted current, especially to the slope with which it passes through zero. For this purpose, it may be suitable to establish the normal position of the damper 48 in such a way that the minimum intensity of quenching necessary for interruption of currents in operating range is provided. If higher currents are to be interrupted, then automatically corresponding larger movement of the damper 48 takes place so that again the intensity of quenching is adjusted to prevailing conditions.

If, for example, in the case of interrupters using liquids, an expansion should be introduced, then blocking of a valve 48 during increasing current can be released when the current begins to decrease, in which case it may be suitable to introduce the expansion shortly before the passage of the current through zero.

A particular advantage of utilizing circuit interrupters in conjunction with the synchronous operator 1 according to the present invention consists in that the breaker mechanism itself can be built in the conventional manner and does not need to move especially fast as it is necessary in the case of synchronized breakers. The control is limited entirely to that the intensity of quenching is matched to the prevailing conditions, which can be done at small expenditure. The interrupting capacity of the breakers of this kind, built according to this invention, can be at approximately the same production cost increased to several times the values so far obtained.

Certain features of the interrupter set forth in FIG. 10 of the drawings are described and claimed in U.S. patent application filed March 27, 1961, Serial No. 98,522, by Fritz Kesselring, and assigned to the Siemens-Schuckertwerke Aktiengesellschaft.

In FIGS. 11 and 12 of the drawings there is illustrated another modified type of compressed-gas circuit interrupter 60. The reference numeral 61 designates a stationary nozzle-like contact and the reference numeral 62 designates a leaf contact electrically connected to it. 63 is a nozzle also preferably made from electrically conducting material and electrically connected with the metal plate 64. The reference numeral 65 indicates an arcing contact. The upper main stud, indicated by the reference numeral 66, is mounted upon an insulating cover 67. The reference numeral 68 indicates the movable contact provided on its sides with slots in which the curved levers 69 and 70 are engaged. The reference numeral 71 designates a magnetic system in which there are arranged the coils 72 and 73 connected with rotating arms 76 and 77 through their shafts 74 and 75. The shaft 75 has attached to its lower end another lever 78. The moving contact 68 is electrically connected with the flexible spring segments 80 which are electrically connected directly to the lower main stud 83 mounted in the insulating cover 84. 85 is a second movable contact which is electrically connected on one side to the main stud 83 and on the other side to a nozzle-like contact 86 and is mounted at its linked end to the insulating rod 87. It can be moved back and forth by lever 78. The breaker is enclosed in a housing 88 which is mounted on insulators 89 and 90. The inside of the insulator 89 is connected with a low pressure container 91 while the insulator 90 is opening into a high pressure tank 92; 93 is a base which is attached to the wall 94. The shaft 75 of the moving coil 72 has attached, at its upper end, an insulating swivel piece 95 which is pushed against the seal ring 96 when the breaker is in the open position.

In addition, there is provided a resistor 97 which is connected on one side to the nozzle 86 through the metal tube 98 and on the other side with a metal cap 99 which in turn is electrically connected to the main stud 66 through the screw 64a and metal plate 64. The insulating resistor housing is designated as 100. 101 is a piston with small openings 102. On its underside, it has attached an arcing pin 103 while compression spring 104 is applied against the upper side. 105 and 106 are the sealing rings.

The arrangement functions in the following manner: When the insulating rod 87 moves to the left by means of the expansion-compression spring 109 in a manner otherwise not shown, then the shafts 75 and with it also the lever 76 are moved by the lever 78 in such manner that the curved lever 70 moves clockwise; in this way, the movable contact 68 is pushed downwards, the compressed air flows through the nozzle 61 and the arc is extinguished when the current goes through the zero. The closing is achieved by moving the insulated rod 87 to the right in the corresponding manner. In general, it is of advantage to provide a certain amount of slack between the levers 70 and 69 and the contact 68, so that the latching, which is provided by the rollers 79 in the closed position, is overcome in a blow-like manner.

When an overcurrent occurs, then the levers 76 and 77 are rotated with a rather large force by the coils 72 and 73 toward an open position when the current is decreasing and toward a closed position when the current is increasing. Simultaneously also the contact pin 85 is moved by the lever 78 toward the left when the current is decreasing. Before the interruption between the nozzle contact 86 and the contact pin 85 takes place, the resistor 97 is connected in parallel with the main interrupting gap, which makes easier the interruption at the current passing through the zero because of the depressing effect on the rise of the recovery voltage. First, the interruption between the main contacts 61 and 68 takes place and then also contacts 85 and 86 are separated. The compressed gas flows under high pressure through the resistor housing 100 and through the upper narrow opening 107 to the low pressure tank 91, which results in interruption of the residual current carried by the resistor when this current goes through the zero. After the foregoing interruption the insulating swivel piece 95 takes a position in front of the opening of the stationary contact 61 and is there firmly held against the seal 96 by the gas pressure. As soon as the contact pin 85 moves away from the seal 105, the piston 101 is driven by the high pressure compressed gas towards the right by which an arc is drawn between the point of the contact pin 85 and the arcing pin 103 which arc carries the residual current reduced by the resistance 97. This arc will be quenched when the current passes through the zero. In the meantime, the pressure in the housing 100 is increasing, whereby the openings 102 in piston 101 have a larger area than the opening 107. The result of this is, that the piston 101 is driven by the spring 104 to the left as the gas pressure on its both sides is very nearly the same and thus the arcing pin 103 is laid against the sealing ring 106, which further seals off the breaker housing 88 also at this point. The pressure against the spring 104 is now given by the cross-section area of the arcing pin 103 at its exposure to the sealing ring 106. This pressure must be smaller than the force of the spring 104, so that an unobjectionable seal is secured. If for any reason the arc quenching does not take place at the first controlled passage of the current through the zero, then the breaker will close and synchronized opening will take place, as described, at the next passage of the current through the zero. If the breaker is used as a reversing switch, then it will be of advantage to arrange a compressor 108 between the low pressure tank 91 and high pressure tank.

It can be noted that the construction of the breaker is simple in that, that breaker operation is accomplished directly by an induction system. Because of small arcing energy, the interrupting contacts can be built at the same time as valves and, therefore, several other valves can be eliminated. In addition, the interrupting capability of the breaker can be improved by additional provision of a parallel resistance 97.

Certain features of the compressed-gas circuit interrupter set forth in FIGS. 11 and 12 of the drawings are set forth and claimed in United States patent application filed August 29, 1961, Serial No. 134,655, by Fritz Kesselring and Ernst Gisiger, and assigned to the assignee of the instant application.

Although we have illustrated and described particular structures it is to be clearly understood that the same were merely for the purpose of illustration, and that changes and modifications may readily be made therein by those skilled in the art without departing from the spirit and scope of the invention.

We claim as our invention:

1. In combination, means defining an alternating-current source for producing current to be interrupted, a synchronous-type alternating-current circuit interrupter for controlling alternating current derived from said current source, circuit means interconnecting said current source with said circuit interrupter, separable contacts to establish an arc connected serially in said circuit means and constituting a part of said circuit interrupter, a synchronous operator for said circuit interrupter including a magnetic circuit having an air gap, magnetomotive force means responsive to said produced current for generating magnetic flux in said magnetic circuit dependent upon the current to be interrupted, a moving coil element disposed within said air gap, means for producing a current in said moving coil element dependent upon the rate of change of the current to be interrupted, and means actuated by movement of said moving coil element to facilitate interruption of the alternating-current to be interrupted.

2. In combination, means defining an alternating-current source for producing current to be interrupted, a synchronous-type alternating-current circuit interrupter for contolling alternating current derived from said current source, circuit means interconnecting said current source with said circuit interrupter, separable contacts to establish an arc connected serially in said circuit means and constituting a part of said circuit interrupter, a synchronous operator for said circuit interrupter including a relatively stationary magnetic circuit having an annular air space therein, magnetomotive force means responsive to said produced current for generating magnetic flux in said relatively stationary magnetic circuit dependent upon the current to be interrupted, a moving coil disposed within said annular air space and adapted to rotate therein, means for producing a current in said moving coil dependent upon the rate of change of the current to be interrupted, and means actuated by rotative movement of said moving coil to facilitate interruption of the alternating-current to be interrupted.

3. In combination, means defining an alternating-current source for producing current to be interrupted, a synchronous-type alternating-current circuit interrupter for controlling alternating current derived from said current source, circuit means interconnecting said current source with said circuit interrupter, separable contacts to establish an arc connected serially in said circuit means and constituting a part of said circuit interrupter, a synchronous operator for said circuit interrupter including a magnetic circuit having an air gap, magnetomotive force means responsive to said produced current for generating magnetic flux in said magnetic circuit dependent upon the current to be interrupted, a moving coil system disposed in said air gap, means for producing a current in said moving coil system dependent upon the rate of change of the current to be interrupted, and means actuated by movement of said moving coil system to facilitate interruption of the alternating current to be interrupted.

4. The combination according to claim 3, wherein the time constant of the moving coil system up to the maximum pretripping current is smaller than one millisecond.

5. In combination, means defining an alternating-current source for producing current to be interrupted, a synchronous-type alternating-current circuit interrupter for controlling alternating current derived from said current source, circuit means interconnecting said current source with said circuit interrupter, separable contacts to establish an arc connected serially in said circuit means and constituting a part of said circuit interrupter, a synchronous operator for said circuit interrupter including a magnetic circuit having an air gap, magnetomotive force means responsive to said produced current for generating magnetic flux in said magnetic circuit dependent upon the current to be interrupted, a moving coil element disposed within said air gap, a separate inductive device having a secondary winding and energized in dependence upon the current to be interrupted, the output leads of said secondary winding being connected to the movable coil element, and means actuated by movement of said moving coil element to facilitate interruption of the alternating current to be interrupted.

6. The combination according to claim 5, wherein the first-mentioned magnetic circuit remains unsaturated up to the maximum pretripping current.

7. The combination according to claim 6, wherein said separate inductive device saturates during the peak of the maximum current to be interrupted.

8. The combination according to claim 7, wherein the magnetic circuit of the separate inductive device has at least six air gaps preferably distributed uniformly about the magnetic circuit.

9. In combination, means defining an alternating-current source for producing current to be interrupted, a synchronous-type alternating-current circuit interrupter for contolling alternating current derived from said current source, circuit means interconnecting said current source with said circuit interrupter, separable contacts to establish an arc connected serially in said circuit means and constituting a part of said circuit interrupter, a synchronous operator for said circuit interrupter including a magnetic circuit having an air gap, magnetomotive force means responsive to said produced current for generating magnetic flux in said magnetic circuit dependent upon the current to be interrupted, a closed-circuit rotatable coil element disposed within said air gap, a separate inductive device energized in accordance with the current to be interrupted having the poles of the air gap thereof substantially normally of the plane of said closed-circuit rotatable coil element, and means actuated by rotative movement of said closed-circuit rotatable coil element to facilitate interruption of the alternating current to be interrupted.

10. The combination according to claim 1, wherein the moving coil element is a closed conductor.

11. The combination of a synchronous operator and a compressed-gas circuit interrupter, a current source for producing current to be interrupted, a pair of separable contacts to establish an arc, a source of gas under pressure to blast said arc, said synchronous operator including a magnetic circuit energized in dependence upon the current to be interrupted, a moving coil element traversed by a current dependent upon the rate of change of the current to be interrupted, and means interconnecting the moving coil element with a blast valve associated with the circuit interrupter.

12. The combination of a synchronous operator and a compressed-gas circuit interrupter, said synchronous operator including a current source for producing current to be interrupted, a pair of separable contacts to establish an arc, a source of gas under pressure to blast said arc, a magnetic circuit energized in dependence upon the current to be interrupted, a moving coil element traversed by a current dependent upon the rate of change of the current to be interrupted, and means interconnecting the moving coil element with the moving contact of the circuit interrupter.

13. In combination, means defining an alternating-current source for producing current to be interrupted, a synchronous-type alternating-current circuit interrupter for controlling alternating current derived from said current source, circuit means interconnecting said current source with said circuit interrupter, separable contacts to establish an arc connected serially in said circuit means and constituting a part of said circuit interrupter, a synchronous operator for said circuit interrupter including a magnetic circuit having an air gap, magnetomotive force means responsive to said produced current for generating magnetic flux in said magnetic circuit dependent upon the current to be interrupted, a moving coil rotatable in said air gap, a stationary additional winding linking the magnetic circuit and electrically connected in series with said moving coil, and means actuated by movement of said moving coil to facilitate interruption of the alternating current to be interrupted.

14. The combination according to claim 13, wherein the moving coil and said additional stationary winding are wound in the same sense.

15. The combination according to claim 13, wherein the initial and final positions of the rotatable coil are substantially symmetrical with respect to the center-line of the magnetic circuit.

16. The combination in a fluid-blast circuit interrupter of separable contacts to establish an arc, a storage tank of high-pressure fluid, rotatable blast-valve means for releasing a blast of extinguishing fluid toward said arc, and a synchronous operator correlating the opening of the blast-valve means with the magnitude of the slope of the rate of change of currents, whereby a more intensive fluid blast will be obtained for higher magnitude fault currents than for load-current interruption.

17. A compressed-gas circuit interrupter including separable contacts to establish an arc, means defining a source of compressed gas, synchronized blast-valve means for preventing an application of compressed gas to said arc until a time of the order of 0.5 to 2 milliseconds before the passage of the line current through current zero, said synchronous blast-valve means including a blast valve and a series rotatable damper valve of low inertia, and said synchronous blast-valve means including a synchronous operator operating said rotatable damper valve and correlating the opening of said rotatable damper valve with the magnitude of the slope of the rate of change of currents to be interrupted, whereby a more intensive gas blast will be obtained for higher magnitude fault currents than for load-current interruption.

18. The combination in a fluid-blast circuit interrupter of separable contacts to establish an arc, a storage tank of high-pressure fluid, rotatable blast-valve means for releasing a blast of extinguishing fluid toward said arc, and a synchronous operator effective in the range of 0.5 to 2 milliseconds before current zero and correlating the opening of the blast-valve means with the magnitude of the slope of the rate of change of currents, whereby a more intensive fluid blast will be obtained for higher magnitude fault currents than for load-current interruption.

19. A liquid-type circuit interrupter including separable contacts to establish an arc, a storage tank of high-pressure liquid, rotatable blast-valve means for releasing a blast of extinguishing liquid toward said arc, and a synchronous operator correlating the opening of the blast-valve means with the magnitude of the slope of the rate of change of currents, whereby a more intensive liquid blast will be obtained for higher magnitude fault currents than for load-current interruption.

20. The combination in a fluid-blast circuit interrupter of separable contacts to establish an arc, a storage tank of high-pressure fluid, rotatable blast-valve means for releasing a blast of extinguishing fluid toward said arc, a synchronous operator effective when the instantaneous current magnitude and its transient change have different signs (i.e., +, −), and said synchronous operator correlating the opening of the blast-valve means with the magnitude of the slope of the rate of change of currents, whereby a more intensive fluid blast will be obtained for higher magnitude fault currents than for load-current interruption.

References Cited by the Examiner
UNITED STATES PATENTS

| | | | |
|---|---|---|---|
| 620,746 | 3/99 | Crehore et al. | 307—133 |
| 2,843,763 | 7/58 | Kafka et al. | 307—133 X |
| 2,890,016 | 6/59 | Hajny | 317—197 |
| 2,902,221 | 9/59 | Hajny | 251—129 |

OTHER REFERENCES

Fitzgerald and Kingsley: Electric Machinery, New York, McGraw-Hill, 1952, Chapter 2, page 68, TK 2000 F5.

MILTON O. HIRSHFIELD, *Primary Examiner.*

LLOYD McCOLLUM, *Examiner.*